(12) United States Patent
Harries et al.

(10) Patent No.: US 10,298,661 B2
(45) Date of Patent: *May 21, 2019

(54) MESSAGE DELIVERY IN A MESSAGING SYSTEM

(71) Applicant: INTERNATIONAL BUSINESS MACHINES CORPORATION, Armonk, NY (US)

(72) Inventors: Dominic P. Harries, Winchester (GB); Samuel D. Hughes, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 387 days.

This patent is subject to a terminal disclaimer.

(21) Appl. No.: 14/539,602

(22) Filed: Nov. 12, 2014

(65) Prior Publication Data

US 2015/0149570 A1 May 28, 2015

(30) Foreign Application Priority Data

Nov. 22, 2013 (GB) .................................. 1320619.8

(51) Int. Cl.
*G06F 15/16* (2006.01)
*H04L 29/08* (2006.01)

(52) U.S. Cl.
CPC .................................. *H04L 67/10* (2013.01)

(58) Field of Classification Search
CPC ..... H04L 2029/06054; H04L 2012/561; H04L 12/2874; H04L 67/10; H04L 7/042; H04L 65/1073
See application file for complete search history.

(56) References Cited

U.S. PATENT DOCUMENTS 4,843,544 A * 6/1989 DuLac .................. G06F 3/0601
710/53
8,346,697 B2 * 1/2013 Lambov .................. G06N 5/02
326/46
(Continued)

FOREIGN PATENT DOCUMENTS

CN 101960825 A 1/2011
CN 102469032 A 5/2012
(Continued)

OTHER PUBLICATIONS

Anonymous, "Finite-State Machine", Wikimedia Foundation, Inc., wikipedia.org, retrieved Oct. 29, 2014, pp. 1-11.
(Continued)

*Primary Examiner* — Aftab N. Khan
*Assistant Examiner* — Anh Nguyen
(74) *Attorney, Agent, or Firm* — Yee & Associates, P.C.; Maeve Carpenter

(57) ABSTRACT

A method, hardware system, and/or computer program product controls message delivery from a publisher application to one or more subscriber applications in a publish/subscribe messaging mechanism. The one or more subscriber applications have a plurality of subscriptions registered with a broker application of the publish/subscribe messaging mechanism. A unified subscription description representing the plurality of subscriptions registered with the broker application is generated, and is then communicated to the publisher application.

20 Claims, 3 Drawing Sheets

(56) References Cited

U.S. PATENT DOCUMENTS

| | | | |
|---|---|---|---|
| 2003/0055668 A1* | 3/2003 | Saran | G06F 9/465 705/301 |
| 2003/0208539 A1* | 11/2003 | Gildenblat | G06F 17/30867 709/205 |
| 2005/0021622 A1* | 1/2005 | Cullen | G06Q 30/02 709/204 |
| 2005/0021843 A1* | 1/2005 | Duigenan | H04L 12/185 709/238 |
| 2005/0064883 A1* | 3/2005 | Heck | H04L 12/5835 455/466 |
| 2006/0085507 A1* | 4/2006 | Zhao | G06Q 10/10 709/206 |
| 2011/0134934 A1* | 6/2011 | Arroyo | H04L 12/5695 370/431 |
| 2011/0153757 A1* | 6/2011 | Rumsey | H04L 51/26 709/206 |
| 2011/0258268 A1* | 10/2011 | Banks | G06Q 10/06 709/206 |
| 2012/0215858 A1 | 8/2012 | Bhogal et al. | |
| 2014/0201276 A1* | 7/2014 | Lymberopoulos | H04W 4/21 709/204 |

FOREIGN PATENT DOCUMENTS

| | | |
|---|---|---|
| CN | 102687167 A | 9/2012 |
| CN | 102859541 A | 1/2013 |
| EP | 1130845 A2 | 9/2001 |
| WO | 9910788 | 3/1999 |
| WO | 2012159252 | 11/2012 |

OTHER PUBLICATIONS

E. Gurari, "An Introduction to the Theory of Computation, Chapter 2.3: Finite-State Automata and Regular Languages", Computer Science Press, 1989, pp. 1-9.

Anonymous, "DFA Minimization", Wikimedia Foundation, Inc., wikipedia.org, last modified Oct. 24, 2014, retrieved Nov. 12, 2014, pp. 1-7.

H. Jafarpour et al., "Subscription Subsumption Evaluation for Content-Based Publish/Subscribe Systems", Springer-Verlag, ACM, Proceedings of the 9th ACM/IFIP/USENIX International Conference on Middleware, 2008, pp. 62-81.

A. Ouksel et al., "Efficient Probabilistic Subsumption Checking for Content-Based Publish/Subscribe Systems", Springer, Lecture Notes in Computer Science, vol. 4290, 2006, pp. 121-140.

Bao Chenming, "Design and Realization of Publish/Subscribe Systems Based on RFD". Doctoral Thesis in Software Engineering, May 31, 2012.

Sheng Gao, "Study on Routing Mechanisms of Publish/Subscribe Systems in Peer-To-Peer Networks". Doctoral Thesis in Computer Software and Theory, Jan. 13, 2012.

* cited by examiner

MESSAGE DELIVERY IN A MESSAGING SYSTEM

BACKGROUND

The invention relates to message delivery in a messaging system, and more particularly to controlling message delivery from a publisher application to one or more subscriber applications.

Publish/subscribe is a messaging mechanism by which subscriber applications (hereinafter referred to as "subscribers") may receive information, in the form of messages, from publisher applications (hereinafter referred to as "publishers"). In this context, a message is a unit of data (such as one or more bits or a string of data) for exchange between application programs. A typical publish/subscribe system has more than one publisher and more than one subscriber.

Interactions between publishers and subscribers are typically controlled by components of a general purpose messaging system, such as a queue manager or by a component known as a message broker. A messaging system is a service to which applications may connect, and a queue is an ordered list of messages maintained by the messaging system. Applications may place a message on a queue or request a message from a queue. The distinction between a queue manager and a message broker is not relevant to the present subject matter and these terms may be used interchangeably within the following description.

Publishers supply information about a subject, without needing to know anything about the applications that are interested in that information. Publishers generate this information in the form of messages, called publications, that they want to publish, and define the topic of these messages. The controlling component (queue manager or message broker) receives messages from publishers and subscriptions identifying subscribers on one or more topics. It then routes the published messages to the subscribers that have a registered interest in the topic(s).

Subscribers create subscriptions that describe the topic that the subscriber is interested in. Thus, the subscription determines which publications are forwarded to the subscriber. Subscribers may make multiple subscriptions and may receive information from many different publishers.

A drawback is that publication of a message may be a costly operation for the publisher and/or the broker. For example, if the publisher is a low-powered sensor which requires the use of a radio to publish a message, publication of a message will consume much-needed battery power. Also, if a message to be published is very large, a large amount of resources may be required to publish the message.

It is therefore desirable for a publisher to avoid unnecessary publication of messages, such as when there are no subscribers for the topic of the message for example. A known approach to address this is for the publisher to transmit information about the message topic to the broker and ask whether there are any subscriptions matching the topic. However, this approach requires a request/response conversation between the publisher and broker. Also, if the publisher is publishing messages about many different topics, many conversations may be required.

SUMMARY

A method, hardware system, and/or computer program product controls message delivery from a publisher application to one or more subscriber applications in a publish/subscribe messaging mechanism. The one or more subscriber applications have a plurality of subscriptions registered with a broker application of the publish/subscribe messaging mechanism. A unified subscription description representing the plurality of subscriptions registered with the broker application is generated, and is then communicated to the publisher application.

BRIEF DESCRIPTION OF THE SEVERAL VIEWS OF THE DRAWINGS

Embodiments of the invention will now be described, by way of example only, with reference to the accompanying drawings in which.

DETAILED DESCRIPTION

Figure 1:
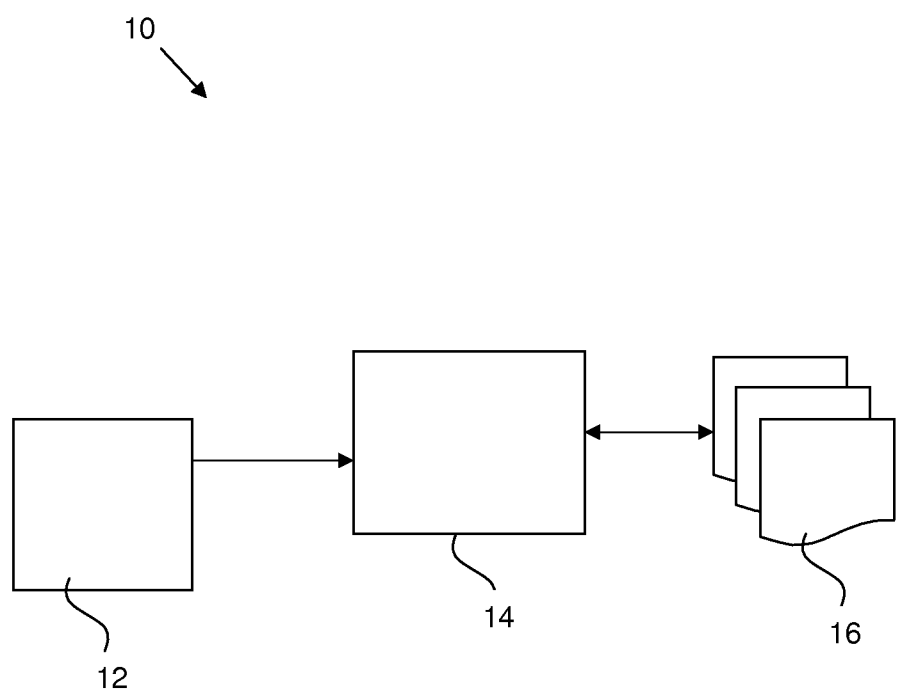
FIG. 1 is a block diagram of an example of an implementation of a messaging system according to an embodiment of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Proposed is a concept for enabling a publisher to only publish a message relating to one or more topics when there are subscribers/consumers for the topic(s). The concept may be employed in a messaging system comprising a publisher, a broker and a plurality of subscribers. It is proposed to generate a consolidated description (otherwise referred to as a "unified subscription description") of the subscriptions and then transmit it to the publisher. The publisher can use the unified subscription description to determine if the topic of a message to be published matches any of the subscriptions. In this way, the publisher can determine if there is any need to publish the message and thereby avoid publishing messages for which there is no subscription.

Referring to FIG. 1, there is depicted a messaging system according to an embodiment of the present subject matter. The messaging system 10 comprises a publisher 12, a message broker 14 and a plurality of subscribers 16. Interactions (such as communication of messages from the publisher 12 to the subscribers 16) are controlled by the message broker 14. The messaging system 10 is a service to which applications may connect and a queue is an ordered list of messages maintained by the messaging system 10. Applications may place a message on a queue or request a message from a queue. The distinction between a queue manager and a message broker is not relevant to the present subject matter and these terms may be used interchangeably within the following description.

The publisher 12 is adapted to supply information about a subject, without needing to know anything about the applications that are interested in that information. The publisher 12 generates the information in the form of messages, or publications, and defines the topic(s) of these messages. The message broker 14 is adapted to receive messages from the publisher 12, in addition to subscriptions from subscribers of one or more topics. The message broker 14 is adapted to route published messages to subscribers that have a registered interest in the topic(s) of the published messages.

To receive publications, a subscriber creates a subscription to selected publication topics. The message broker 14 is adapted to deliver publications to subscribers that have subscriptions which match the publication topic (and are authorized to receive the publications).

A topic can be implemented as a text string describing an area of interest on which applications may wish to exchange messages (e.g., "device attributes"). Subjects may be organized hierarchically, such as into a topic tree, using the forward slash ("/") character to create subtopics in the topic string (e.g., "device attributes/temperature"). Topics are nodes in the topic tree that is the total space of all topics used within the messaging infrastructure. Topics may be leafnodes with no further subtopics, or intermediate nodes with subtopics. Topic strings that are created to represent subscriptions may contain wildcard schemes to pattern match against the topics of publications.

Subscribers 16 create subscriptions that describe the topic(s) that the subscriber is interested in. Thus, the subscription determines which publications are of interest to the subscriber. Subscribers may make multiple subscriptions and may receive information from many different publishers.

A subscription may be represented by a regular expression such as text string for example. Thus, more generally, a representation of a subscription may be represented using regular grammar. In the field of computer science, a regular grammar is a formal grammar that describes a regular language.

Subscriptions may be of two types: durable and non-durable. Non-durable subscriptions exist only as long as the subscribing application's connection to the message broker 14 remains active. The subscription is removed when the subscribing application disconnects from the message broker 14 deliberately or by loss of connection.

Durable subscriptions continue to exist when a subscribing application's connection to the message broker 14 is closed. If a subscription is durable, when the subscribing application disconnects, the subscription remains in place and may be used by the subscribing application when it reconnects.

Using the present subject matter, a unified subscription description of the subscriptions is generated by the message broker 14 and then transmitted to the publisher 12. The publisher can use the received unified subscription description to determine if the topic of a message to be published matches any of the subscriptions. If subscribers exist, the message is communicated to the message broker 14 for subsequent delivery to the appropriate subscribers. However, if it is determined from the unified subscription description that no subscriber is present for the message topic, the message is not communicated to the message broker 14. It may, instead be stored by the publisher 12 and later delivered to the message broker if and when a new unified subscription description is delivered to the publisher 12 which indicates the existence of a subscriber for the message topic.

Thus, the messaging system 10 includes a selective publication concept whereby the publisher 12 selects whether or not to publish a message based on a merged or consolidated description (a "unified subscription description") of the subscriptions provided to it by the message broker 14. In this example of the messaging system 10, in response to subsequent registration of a new subscriber 16 for a specified topic, a new unified subscription description is generated by the message broker 14 and 'pushed' (i.e. communicated without request) to the publisher 12.

In the messaging system 10, connection of a subscriber 16 to the system 10 causes the generation of a new unified subscription description, which is then communicated to the publisher 12. At the same or any time afterwards, a subscriber 16 that is already connected to the system 10 may register a new subscription for a topic in which it is interested with the message broker 14. Subscribers 16 may do this on a durable basis (once registered, the subscription remains until explicitly deleted) or a non-durable basis (when the application disconnects, the subscription is removed). A new unified subscription description may be generated and communicated to the publisher 12 every time there is a change in the subscriptions.

A regular expression (such as a text string) describing a topic may be converted into an automaton called a finite state machine (FSM). The fact that FSMs and regular expressions are equivalent is well understood from automata theory. The act of determining whether an input string matches a regular expression is exactly the same as determining whether the string is accepted by the corresponding FSM. Also, it is possible to take the union of any collection of FSMs, wherein the "union FSM" accepts any string accepted by any of the input FSMs. Taking the union of two FSMs is accomplished by creating a new FSM each of whose states is a tuple containing a state from the first FSM and a state from the second FSM. This procedure easily generalizes to arbitrary numbers of FSMs.

In the illustrated example of FIG. 1, the procedure followed by the broker 14 to generate a unified subscription description may be summarized as follows:
  Take each subscription string in turn.
  Convert each subscription string to an FSM.
  Compute the "union FSM" of all of these FSMs.
  Minimize the FSM (e.g. make it as small as possible).
  Serialize the FSM. For example, by simply writing out its attributes like as follows: fsm(alphabet={"a","b"}, states={0,1}, initial=0, finals={1})
  The serialized FSM is then transmitted to the publisher 12. The publisher 12 receives, deserializes and stores the "union FSM" for future use.

When a new message is to be published to a topic, the procedure followed by the publisher 12 may be summarized as follows:
  Determine whether the FSM accepts the topic string.
  If the FSM accepts the topic string, conclude that there is at least one subscriber who wants this message and therefore publish message.
  If the FSM does not accept the topic string, conclude that there are no subscribers who want the message and therefore do not publish the message.

If a new subscription is registered at the message broker 14 (either for an existing or new subscriber), the message broker 14 may generate a new unified subscription description as follows:
  Convert the new subscription to an FSM.
  Compute the union of the old union FSM and the new subscription FSM, to create a new union FSM.
  Minimize the new FSM.
  Serialize the new FSM.
  This process may be quicker than computing an entirely new union FSM from all of the subscriptions.

It will be understood that the new FSM can then be transmitted to the publisher 12 for storage and subsequent use in determining whether or not to publish a message.

Also, it will be understood that much of this information can be cached. The message broker 14 may therefore cache the FSM form of each subscription string, so that the string to FSM conversion process only need be performed once per unique subscription. Accordingly, the message broker 14 may be adapted to cache the minimized union FSM and to cache the serialized form of the union FSM.

It may be preferable for the publisher 12 to keep the union FSM itself cached, and not the serialized version that is received from the message broker 14.

It is also noted that that the unified subscription description (e.g. the union FSM) may not necessarily change every time individual subscriptions change. For example, if subscriber A subscribes to the topic "temperature/+", then later subscriber B subscribes to "temperature/hursley", the resulting union remains unchanged. Thus, it may not be necessary to transmit a new unified subscription description to the subscriber 12. Embodiments may therefore be adapted to determine if the unified subscription description has changed after a subscription change, and only transmit the new unified subscription description if it is determined to have changed.

Figure 2:
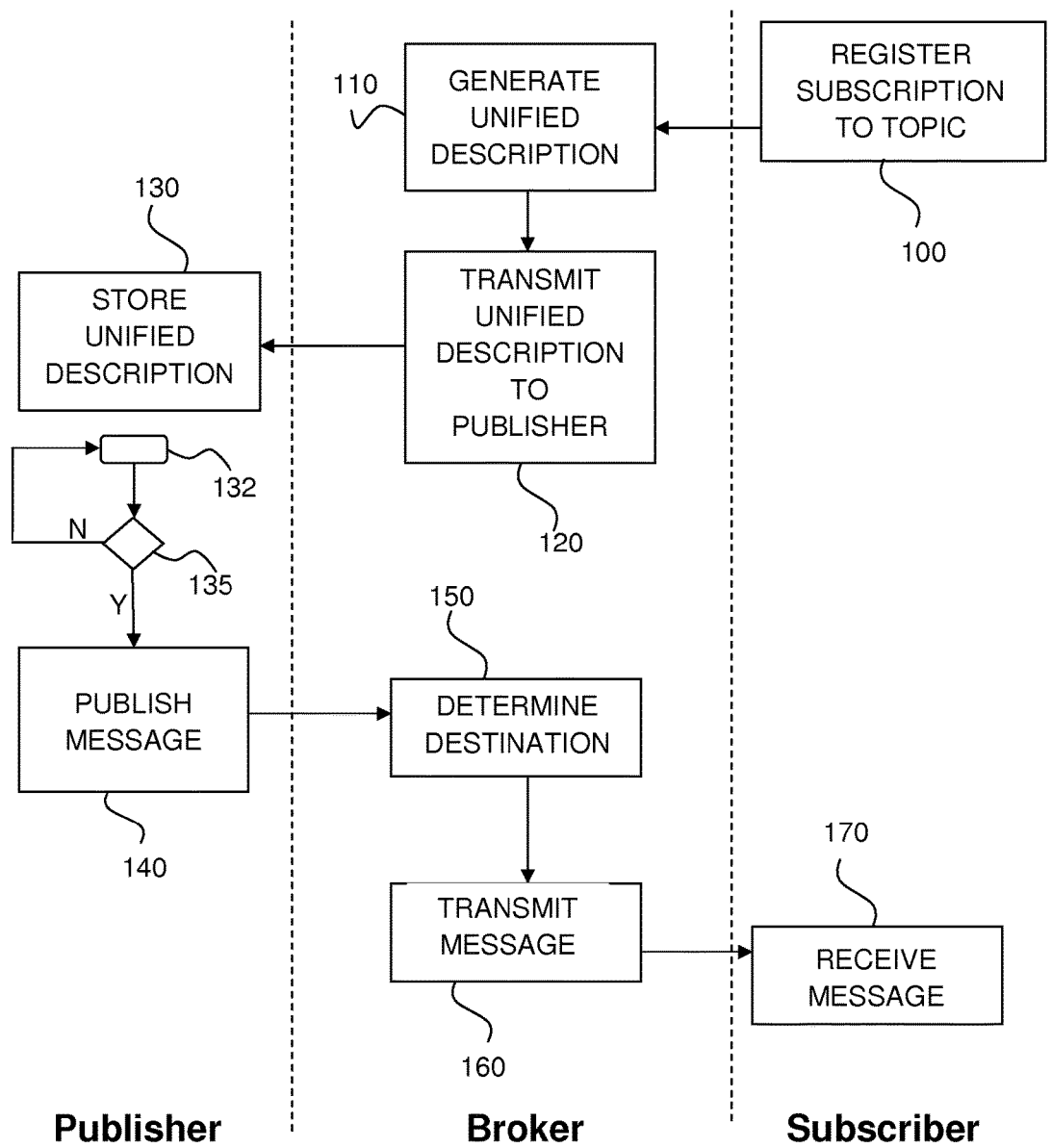
FIG. 2 is a flow chart of an example of an implementation of method according to an embodiment of the present subject matter.

FIG. 2 is a flow chart of an example of an implementation of method according to an embodiment of the present subject matter. FIG. 2 shows the steps of the method carried out by a messaging system, such as the system in FIG. 1, according to one example of the present subject matter. Here, it is noted that a subscriber registration list maintained by the message broker is initially empty.

First, in step 100, one or more subscribers create subscriptions which describe the topic(s) that the one or more subscribers are interested in, and then register the subscriptions with the broker. The subscriptions determine which publications are of interest to the subscriber(s) and are represented as regular expressions (such as text strings for example).

Next, in step 110, the broker generates a unified subscription description of the registered subscriptions. Here, each regular expression (e.g. text string) describing a topic of interest is converted into a FSM, and then the union FSM of all of the FSMs is computed.

The union FSM is then transmitted to the publisher in step 120, and the publisher subsequently receives and stores the union FSM in step 130.

When a new message is to be published to a topic by the publisher (in step 132), the method proceeds to step 135, wherein the publisher determines whether the topic(s) of the message to be published matches any of the subscriptions using the stored unified subscription description. Here, this comprises determining whether the stored union FSM accepts the topic string of the message to be published. If it is determined that the FSM does not accept the topic string, it is concluded that there are no subscribers who want the message and the method returns back to step 132 to wait for a new message to be published. Conversely, if, in step 135, it is determined that the FSM accepts the topic string, it is concluded that there is at least one subscriber who wants this message and the method proceeds to step 140 wherein the message is communicated to the broker for subsequent delivery to the appropriate subscribers.

The broker receives the message communicated from the publisher and then determines, in step 150, the destination(s) of the message based on the registered subscriptions for the topic of the message. The broker then transmits the message to the destination(s) of the appropriate subscriber(s) in step 160 and the message is received by the subscriber(s) in step 170.

Figure 3:
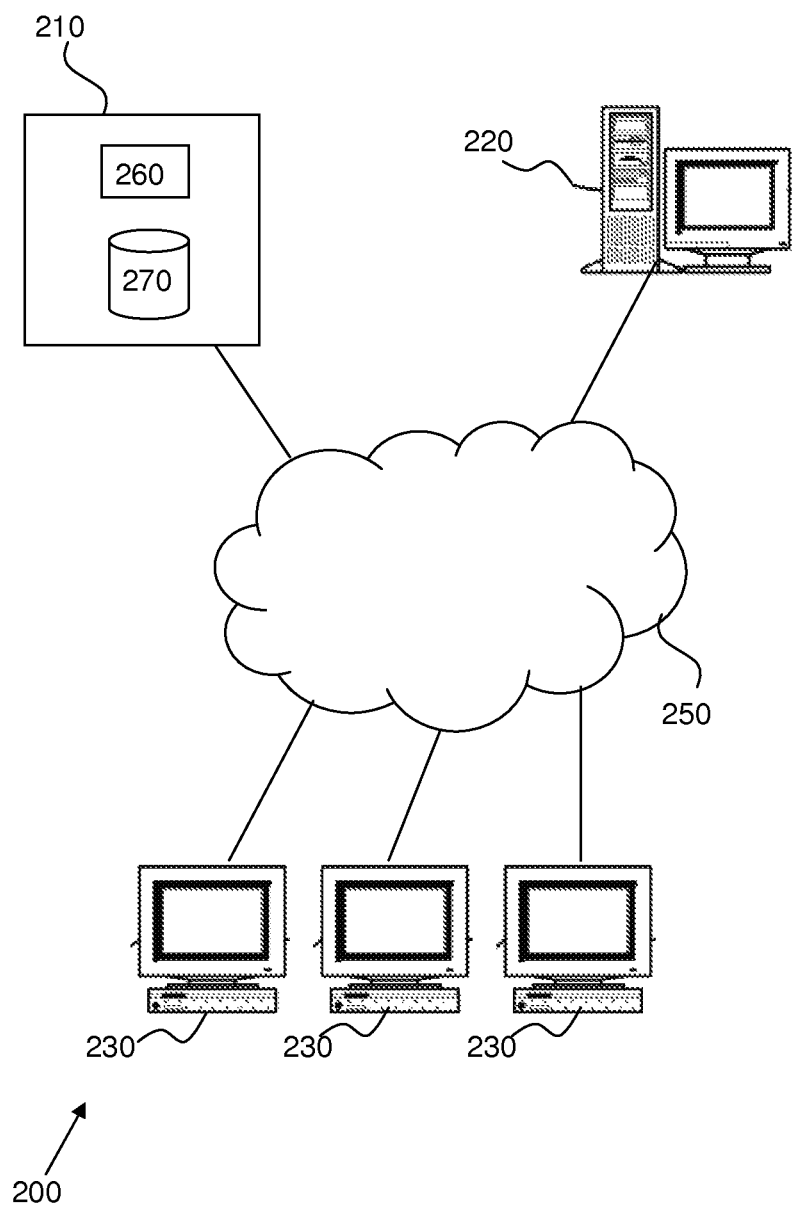
FIG. 3 is a schematic block diagram of a system according to an embodiment of the present subject matter.

FIG. 3 is a schematic block diagram of a messaging system 200 according to an embodiment of the present subject matter. The messaging system 200 comprises a publisher 210, a message broker server 220, and a plurality of subscriber terminals 230. The publisher 210, message broker server 220, and subscriber terminals 230 are all connected to a communication network 250 (such as the Internet for example).

The subscribers create subscriptions to selected publication topics and register the subscriptions with the message broker server 220.

The message broker server 220 is adapted to generate a unified subscription description of the registered subscriptions. Such a generated unified subscription description represents the registered subscriptions in a consolidated format which may, for example, be of a reduced data size and represented and/or communicated more efficiently than the information about the registered subscriptions as provided to the message broker server 220.

The message broker server 220 is adapted to transmit the unified subscription description to the publisher 210 via the communication network 250.

The publisher 210 comprises a processing unit 260 and a data storage unit 270. The data storage unit 270 is adapted to store a unified subscription description received from the message broker server 220 (via the communication network 250). The processing unit 260 is adapted to analyze a unified subscription description stored in the data storage unit 270 so as to determine if the topic of a message to be published matches any of the subscriptions represented by the unified subscription description.

Thus, the publisher 210 is adapted to use the received unified subscription description to determine if the topic of a message to be published matches any of the registered subscriptions. If there are registered subscriptions for the message topic, the message is transmitted (via the communication network 250) to the message broker server 220 for subsequent delivery to the appropriate subscriber terminals 230.

However, if it is determined from the unified subscription description that there are no registered subscriptions for the message topic, the message is not transmitted by the publisher 210. The message may, instead, be stored in the data storage unit 270 of the publisher 210 and later transmitted to the message broker server 220 if and when a new unified subscription description is delivered to the publisher 210 which indicates the existence of a subscriber for the message topic. Alternatively, the message may be discarded (immediately or after a predetermined amount of time). In order to avoid locking up of applications and to trigger generation of an appropriate feedback message, the present subject matter may be implemented such that if no new subscription for the message topic is registered within a predetermined time, the message may be discarded (e.g. deleted from the data storage unit 270).

It will be appreciated that the messaging system 200 enables a selective publication concept by generating a unified description of topic subscriptions and providing the unified description to a publisher 210. Using the unified description of topic subscriptions, the publisher 210 is able to determine whether or not a message should be published. This may help to avoid unnecessary communication between the message broker server 220 and the publisher 210. It may also avoid unnecessary message transmissions from the publisher 210. As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit", "module" or "system". Furthermore, aspects of the present invention may take the form of a computer program product embodied in any one or more computer readable medium(s) having computer usable program code embodied thereon.

Proposed is a method for controlling message delivery from a publisher application to one or more subscriber applications of a messaging system, wherein the one or more subscriber applications each have one or more subscriptions registered with a broker application of the messaging system. The method comprises: generating a unified subscription description representing a plurality of subscriptions registered with the broker application; and communicating the unified subscription description to the publisher application.

According to an aspect of the invention, there is provided a method for controlling message delivery from a publisher application to one or more subscriber applications of a messaging system, the one or more subscriber applications having a plurality of subscriptions registered with a broker application of the messaging system, the method comprising: generating a unified subscription description representing the plurality of subscriptions registered with the broker application; and communicating the unified subscription description to the publisher application.

Embodiments may therefore propose a method by which a single unified or consolidated subscription may be generated to represent all of the subscriptions. This unified representation can then be provided to the publisher, as either a push or a pull operation, and subsequently used to determine whether or not a message should be published. Such an approach may avoid the need for costly communication and/or conversations between a publisher and broker. Also, the unified subscription description may be much smaller in size than a complete list of all subscriptions. Embodiments may therefore reduce the amount of data transmitted between a publisher and broker.

Embodiments may also enable a publisher to minimize the amount of messages it publishes, which may in turn reduce the amount of resources used/required by the publisher.

The step of generating a unified subscription description may comprise computing the union Finite State Machine (FSM) of a plurality of FSMs representing the plurality of subscriptions. Also, the plurality of subscriptions registered with the broker application may be represented by a plurality of text strings, and the step of computing the union FSM may then be preceded by the step of converting each of the plurality of text strings into a respective FSM so as to obtain the plurality of FSMs representing the plurality of subscriptions.

The union FSM may be minimized and/or serialized so as to have improved transmission properties.

The publisher application may use the unified subscription description to determine if a message to be published matches any of the plurality of subscriptions, and only publish the message if it is determined that the message matches any of the plurality of subscriptions. If the topic of a message matches any of the plurality of subscriptions, it may be determined that there is at least one subscriber who wants the message, and the publisher may then publish the message. Conversely, if the topic of the message does not match any of the plurality of subscriptions, it may be determined that there are no subscribers who want the message, and the publisher may not then publish the message.

In other words, before publishing a message, the publisher may check whether or not the topic of the message matches any of the subscriptions represented by the unified subscription. In this way, the publisher application may be arranged to only publish a message if there is a subscriber for its content. Unnecessary publication of messages may thus be avoided.

Also, a message may be stored at the publisher application if it is determined that the message to be published does not match any of the plurality of subscriptions. The stored message may be discarded if it is not published within a predetermined time.

Embodiments provide a concept for enabling a publisher to publish a message relating to one or more topics only when there are subscribers/consumers for the topic(s). The concept may be employed in a publisher-subscriber system comprising a publisher subsystem, a broker subsystem and a plurality of subscriber subsystems. The broker subsystem may generates a union (i.e. a consolidated description) of all subscriptions as a union FSM and then transmit it to the publisher subsystem. The publisher subsystem may then store the union FSM and use the union FSM to determine if the topic of a message to be published matches against any of the subscriptions. The publisher subsystem may publish the message only if its topic matches any of the subscriptions.

According to another aspect of the invention, there is provided a computer program product for controlling message delivery from a publisher application to one or more subscriber applications of a messaging system, the one or more subscriber applications having a plurality of subscriptions registered with a broker application of the messaging system, wherein the computer program product comprises a computer-readable storage medium having computer-readable program code embodied therewith, the computer-readable program code configured to perform the steps of: generating a unified subscription description representing the plurality of subscriptions registered with the broker application; and communicating the unified subscription description to the publisher application.

According to yet another aspect of the invention, there is provided a messaging system for controlling message delivery from a publisher application to one or more subscriber applications, the one or more subscriber applications having a plurality of subscriptions registered with a broker application, the system comprising: a processing unit adapted to generate a unified subscription description representing the plurality of subscriptions registered with the broker application and to communicate the unified subscription description to the publisher application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

controlling message delivery from a publisher application operating on a publisher device to one or more subscriber applications in a publish/subscribe messaging mechanism, the one or more subscriber applications having a plurality of subscriptions registered with a broker application operating on a message broker server, wherein the broker application is adapted to receive messages from the publisher application and subscriptions from the one or more subscriber applications, wherein the publisher device performs steps of;

receiving, by the publisher device, a unified subscription description representing the plurality of subscriptions registered with the broker application in the message broker server, wherein the unified subscription description is a consolidation of the plurality of subscriptions registered with the broker application in the message broker server, and wherein the unified subscription description is received by the publisher device from the message broker server via an Internet;

determining, by the publisher device, whether a particular message topic of a particular message generated by the publisher device matches at least one subscription from the unified subscription description received from the message broker server;

determining, by the publisher device, that the particular message topic does not match at least one subscription from the unified subscription description received from the message broker server; and in response to determining that the particular message topic does not match at least one subscription from the unified subscription description received from the message broker server, blocking, by the publisher device, transmission of the particular message to the message broker server in order to conserve communication bandwidth between the publisher device and the message broker server.

2. The method of claim 1, wherein said generating the unified subscription description comprises:

computing a union finite state machine (FSM) from a plurality of FSMs that represent the plurality of subscriptions registered with the broker application in the message broker server.

3. The method of claim 2, wherein the plurality of subscriptions registered with the broker application is represented by a plurality of text strings, and wherein said computing the union FSM is preceded by:

converting each of the plurality of text strings into a respective FSM so as to obtain the plurality of FSMs that represent the plurality of subscriptions registered with the broker application in the message broker server.

4. The method of claim 2, wherein said generating the unified subscription description further comprises at least one of: minimizing the union FSM; and serializing the union FSM.

5. The method of claim 1, wherein the publisher device is a sensor, wherein the sensor generates sensor readings, and wherein a transmitter transmits the sensor readings from the sensor to the message broker server.

6. The method of claim 1, further comprising:

in response to determining that the particular message to be published does not match any of the plurality of subscriptions registered with the broker application in the message broker server, storing, on the publisher device, the particular message at the publisher application for subsequent publication at a later time.

7. The method of claim 6, further comprising;

discarding, by the publisher device, the stored message from the publisher device if the stored message is not published to the message broker server within a predetermined time.

8. A computer program product comprising a computer readable storage medium having program code embodied therewith, wherein the computer readable storage medium is not a transitory signal, and wherein the program code is readable and executable by a processor to perform a method comprising:

controlling message delivery from a publisher application operating on a publisher device to one or more subscriber applications of a publish/subscribe messaging mechanism, the one or more subscriber applications having a plurality of subscriptions registered with a broker application of the publish/subscribe messaging mechanism, wherein the broker application is adapted to receive messages from the publisher application and subscriptions from the one or more subscriber applications;

receiving, by the publisher device, a unified subscription description representing the plurality of subscriptions registered with the broker application in the message broker server, wherein the unified subscription description is a consolidation of the plurality of subscriptions registered with the broker application in the message broker server, publishing the message only in response to determining that the message to be published matches any of the plurality of subscriptions and wherein the unified subscription description is received by the publisher device from the message broker server via an Internet;

determining, by the publisher device, whether a particular message topic of a particular message generated by the publisher device matches at least one subscription from the unified subscription description received from the message broker server;

determining, by the publisher device, that the particular message topic does not match at least one subscription from the unified subscription description received from the message broker server; and in response to determining that the particular message topic does not match at least one subscription from the unified subscription description received from the message broker server, blocking, by the publisher device, transmission of the particular message to the message broker server.

9. The computer program product of claim 8, wherein said generating the unified subscription description comprises:

computing a union finite state machine (FSM) from a plurality of FSMs that represent the plurality of subscriptions registered with the broker application in the message broker server.

10. The computer program product of claim 9, wherein the plurality of subscriptions registered with the broker application is represented by a plurality of text strings, and wherein said computing the union FSM is preceded by:

converting each of the plurality of text strings into a respective FSM so as to obtain the plurality of FSMs that represent the plurality of subscriptions registered with the broker application in the message broker server.

11. The computer program product of claim 9, wherein said generating the unified subscription description further comprises at least one of: minimizing the union FSM; and serializing the union FSM.

12. The computer program product of claim 8, where the method further comprises:

determining, at the publisher application and based on the unified subscription description, if a message to be published matches any of the plurality of subscriptions; and publishing the message only in response to determining that the message to be published matches any of the plurality of subscriptions.

13. The computer program product of claim 12, wherein the method further comprises:

in response to determining that the message to be published does not match any of the plurality of subscriptions registered with the broker application in the message broker server, storing the message at the publisher application for subsequent publication at a later time.

14. The computer program product of claim 13, wherein the method further comprises discarding the stored message if the stored message is not published within a predetermined time.

15. A hardware device comprising a hardware processor, a computer readable memory, and a non-transitory computer readable storage medium, wherein program code is stored on the non-transitory computer readable storage medium, wherein the program code is configured to perform, when loaded into the computer readable memory and executed by the hardware data processor, a method comprising:

controlling message delivery from a publisher application operating on a publisher device to one or more subscriber applications in a publish/subscribe messaging mechanism, the one or more subscriber applications having a plurality of subscriptions registered with a broker application of the publish/subscribe messaging mechanism, wherein the broker application is adapted to receive messages from the publisher application and subscriptions from the one or more subscriber applications;

receiving, by the publisher device, a unified subscription description representing a plurality of subscriptions registered with a broker application in a message broker server, wherein the unified subscription description is a consolidation of the plurality of subscriptions registered with the broker application in the message broker server, and wherein the unified subscription description is received by the publisher device from the message broker via an Internet;

determining, by the publisher device, whether a particular message topic of a particular message generated by the publisher device matches at least one subscription from the unified subscription description received from the message broker server;

determining, by the publisher device, that the particular message topic does not match at least one subscription from the unified subscription description received from the message broker server; and in response to determining, by the publisher device, that the particular message topic does not match at least one subscription from the unified subscription description received from the message broker server, blocking, by the publisher device, transmission of the particular message to the message broker server.

16. The hardware device of claim 15, wherein said generating the unified subscription description comprises:
computing a union finite state machine (FSM) from a plurality of FSMs that represent the plurality of subscriptions registered with the broker application in the message broker server.

17. The method of claim 2, further comprising:
transmitting, from the publisher device to the union FSM, a new message;
detecting, by the publisher device, that the union FSM has rejected the new message; and
determining, by the publisher device, that there are no current subscribers for the new message based on the union FSM rejecting the new message and blocking transmission of the new message to the message broker server.

18. The method of claim 5, wherein the sensor readings are transmitted from the sensor to the message broker server by a radio.

19. The method of claim 1, further comprising:
in response to determining, by the publisher device, that the particular message topic matches at least one subscription from the unified subscription description received from the message broker server, transmitting, from the publisher device, the particular message topic to the message broker server.

20. The method of claim 1, further comprising:
identifying, by the message broker server, subscriptions received by the message broker server that contain a wildcard, wherein the wildcard is a placeholder for a subscription parameter; and
consolidating, by the message broker server, subscriptions that contain the wildcard with subscriptions that contain the subscription parameter in order to generate the unified subscription description.

* * * * *